(12) United States Patent
Blohm et al.

(10) Patent No.: US 12,242,883 B2
(45) Date of Patent: Mar. 4, 2025

(54) SOFTWARE SERVICE INTEGRATION IN A CENTRAL SOFTWARE PLATFORM

(71) Applicants: Nicole Blohm, Mount Pleasant, SC (US); Steven Cousins, Nashville, TN (US)

(72) Inventors: Nicole Blohm, Mount Pleasant, SC (US); Steven Cousins, Nashville, TN (US)

(73) Assignee: RICOH COMPANY, LTD., Tokyo (JP)

( * ) Notice: Subject to any disclaimer, the term of this patent is extended or adjusted under 35 U.S.C. 154(b) by 101 days.

(21) Appl. No.: 17/196,503

(22) Filed: Mar. 9, 2021

(65) Prior Publication Data
US 2022/0291949 A1    Sep. 15, 2022

(51) Int. Cl.
  *G06F 9/48*    (2006.01)
  *G06N 20/00*   (2019.01)

(52) U.S. Cl.
  CPC ........... *G06F 9/4843* (2013.01); *G06N 20/00* (2019.01)

(58) Field of Classification Search
  CPC ...... G06F 9/4843; G06F 9/5038; G06N 20/00
  See application file for complete search history.

(56) References Cited

U.S. PATENT DOCUMENTS

| | | | |
|---|---|---|---|
| 2002/0138543 A1* | 9/2002 | Teng | G06Q 10/06 707/E17.005 |
| 2004/0230592 A1 | 11/2004 | Fischer | |
| 2011/0119102 A1* | 5/2011 | Horn | G06Q 10/06 709/206 |
| 2013/0103417 A1 | 4/2013 | Seto | |
| 2013/0311481 A1* | 11/2013 | Bhatt | G06F 16/31 707/741 |
| 2015/0128152 A1* | 5/2015 | Lachaume | H04L 67/1095 719/316 |

(Continued)

FOREIGN PATENT DOCUMENTS

| | | |
|---|---|---|
| WO | WO2022/072908 | 4/2022 |
| WO | 2022/122128 | * 6/2022 |

OTHER PUBLICATIONS

Cardoso, K.V. ; Correa, S.L. ; de Rezende, J.F. ; da Silva, B.S. ; de Mello, M.O.M.C. ; Cruz, M.A .; Using traffic filtering rules and OpenFlow devices for transparent flow switching and automatic dynamic-circuit creation in hybrid networks; 2016, vol. 117, p. 113-128.*

*Primary Examiner* — Jorge A Chu Joy-Davila
(74) *Attorney, Agent, or Firm* — Hickman Becker Bingham Ledesma LLP (57) ABSTRACT

In an embodiment, an apparatus comprises one or more processors and one or more memories communicatively coupled to the one or more processors and storing instructions which, when processed by the one or more processors, cause: providing one or more first software services to a client computing device corresponding to a particular entity profile for a particular entity; identifying data in the particular entity profile identifying one or more second software services used by the particular entity; while executing a first workflow for the one or more first software services, identifying a trigger for the one or more second software services; in response to identifying the trigger, executing a second workflow for the one or more second software services using data extracted from the first workflow.

20 Claims, 5 Drawing Sheets

(56) References Cited

U.S. PATENT DOCUMENTS

| | | | |
|---|---|---|---|
| 2016/0171613 A1* | 6/2016 | Snell | G06Q 10/06312 |
| | | | 705/36 R |
| 2017/0177725 A1 | 6/2017 | High | |
| 2017/0277516 A1* | 9/2017 | Grebnov | G06F 9/5038 |
| 2017/0287075 A1 | 10/2017 | Albert | |
| 2019/0019130 A1* | 1/2019 | Gentilhomme | G06Q 10/06316 |
| 2021/0019383 A1* | 1/2021 | Huang | G06F 21/57 |
| 2021/0096904 A1* | 4/2021 | Sodagar | G06F 9/4881 |
| 2021/0271636 A1* | 9/2021 | Watanabe | G06F 16/353 |
| 2021/0383316 A1 | 12/2021 | Mimassi | |
| 2022/0245549 A1* | 8/2022 | Leger | G06Q 10/10 |
| 2023/0245174 A1 | 8/2023 | Rajasekaran | |

* cited by examiner

SOFTWARE SERVICE INTEGRATION IN A CENTRAL SOFTWARE PLATFORM

FIELD

The technical field of the present disclosure relates to improved methods, systems, computer software, and/or computer hardware in the server provided software services. The disclosure relates more specifically to integration of disparate software services under a single interface.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Companies often utilize a large number of different software services, often with different providers. Examples include mail services, payment services, chat interfaces, management services, and other services that allow a company to run effectively. While many of the services used by a company utilize similar or related information, the services are often disparate with no interaction between them. This creates computational inefficiency as communication across services must be manually performed, creating a delay in the processing of important information. The lack of connection between software services often exists due to services being provided by different service providers or services provided by a single provider being modular in implementation, allowing a user to select which services to have activated.

Thus, there is a need for a system that integrates disparate services under a single interface or service implementation.

SUMMARY

The appended claims may serve as a summary. In an embodiment, an system comprises one or more processors and one or more memories communicatively coupled to the one or more processors and storing instructions which, when processed by the one or more processors, cause: providing one or more first software services to a client computing device corresponding to a particular entity profile for a particular entity; identifying data in the particular entity profile identifying one or more second software services used by the particular entity; while executing a first workflow for the one or more first software services, identifying a trigger for the one or more second software services; in response to identifying the trigger, executing a second workflow for the one or more second software services using data extracted from the first workflow. The approach may also be implemented by computer-readable media storing instructions which and a computer-implemented method.

BRIEF DESCRIPTION OF THE DRAWINGS

Embodiments are illustrated by way of example, and not by way of limitation, in the figures of the accompanying drawings and in which like reference numerals refer to similar elements.

DETAILED DESCRIPTION

In the following description, for the purposes of explanation, numerous specific details are set forth in order to provide a thorough understanding of the embodiments. It will be apparent, however, to one skilled in the art that the embodiments may be practiced without these specific details. In other instances, well-known structures and devices are shown in block diagram form in order to avoid unnecessarily obscuring the embodiments.
I. GENERAL OVERVIEW
II. SYSTEM ARCHITECTURE
   A. Processing and Management System
   B. Database
   C. Network
III. PROCEDURAL OVERVIEW
IV. PRIORITY DETERMINATION
V. CATEGORY DETERMINATION
VII. IMPROVED DISPLAYS AND INTEGRATION
VIII. IMPLEMENTATION MECHANISMS

I. General Overview

According to various embodiments, computer-implemented apparatus, methods, and systems are provided that enable integration of disparate services. The disparate services may include any of control services, file processing services, transaction tracking services, and/or processing management services. The services may be provided by a platform provider server computer or an external server computer.

The systems and methods described herein allow a server computer to link different services and services provided by different entities by generating triggers within workflows. The triggers may comprise conditions relating to an event within a first workflow, such as an identification of a particular document type, identification of a particular unique identifier, or completion of a task. The triggers may further comprise a consequent of a workflow to be initiated in a separate service. A platform provider server may receive data indicating that the condition of the trigger has been satisfied and, in response, cause performance of the workflow, such as in a service managed by the platform provider server or an external service.

Technical benefits include improved computer and system efficiency by shifting the computer storage, memory, and processing burdens of initiating workflows to a platform provider server computer. This decreases the excessive use of network bandwidth, as well as decreases the use of processing resources, such as CPU usage, and memory that the computing systems would use during manual processes performed in disparate applications. The systems and methods described herein further improve storage by de-duplicating data used by multiple services and storing the de-duplicated data in a central repository.

II. System of Architecture

Figure 1A:
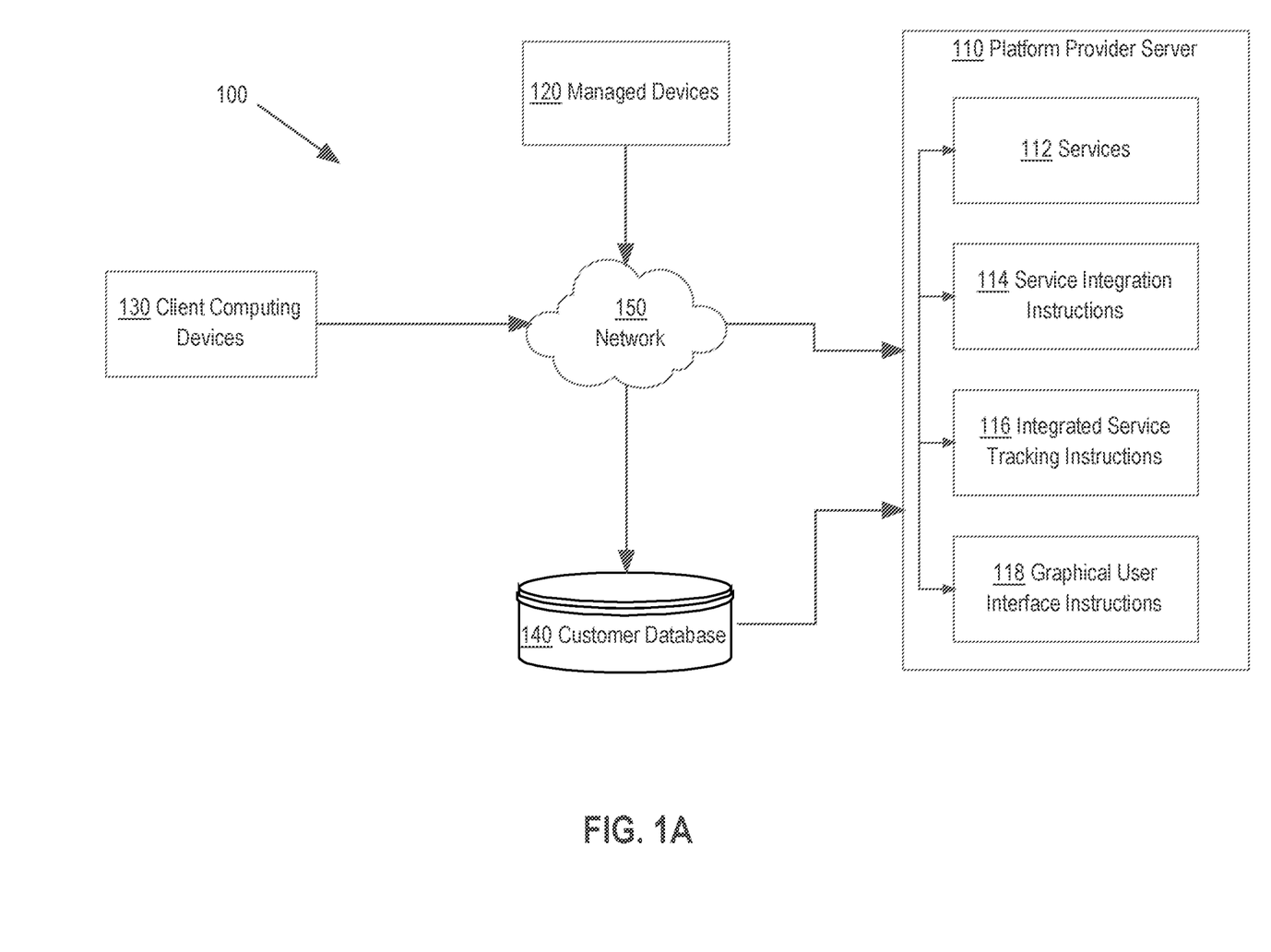
FIG. 1A depicts a networked computer system.

FIG. 1A depicts a networked computer system 100. In an embodiment, the computer system 100 comprises components that are implemented at least partially by hardware at one or more computing devices, such as one or more hardware processors executing program instructions stored in one or more memories for performing the functions that are described herein. All functions described herein are intended to indicate operations that are performed using programming in a special-purpose computer or general-purpose computer, in various embodiments. A "computer" or "computing device" may be one or more physical computers, virtual computers, and/or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices. Any reference to "a computer" or "a computing device" herein may mean one or more computers, unless expressly stated otherwise. The instructions identified above are executable instructions and may comprise one or more executable files or programs that have been compiled or otherwise built based upon source code prepared in JAVA, C++, OBJECTIVE-C or any other suitable programming environment.

FIG. 1A depicts only one of many possible arrangements of components configured to execute the programming described herein. Other arrangements may include fewer or different components, and the division of work between the components may vary depending on the arrangement. In the example of FIG. 1A, a networked computer system 100 may facilitate the secure exchange of data between a platform provider server 110, one or more managed devices 120, and a client computing device 130. The platform provider server 110 and one or more managed devices 120 of FIG. 1A may represent or be associated with one or more computers that host or execute processes that provide the functions and operations that are described further herein. The networked computer system 100 is not limited the particular elements depicted in FIG. 1A and may include fewer or additional elements depending upon a particular implementation.

A. Processing and Management System

Platform provider server 110 may be a system configured to provide a software platform through which one or more application services are provided. Embodiments are depicted in the figures and described herein in the context of a single platform provider server 110 for the purposes of explanation, but any number of platform provider servers may be used.

The platform provider server 110 may be configured to process incoming information, control one or more managed devices 120, generate metrics and/or improved displays, integrate provided services with existing services, and/or provide information, alerts, or other notifications to a client computing device 130. In an embodiment, platform provider server 110 executes one or more of service integration instructions 114, integrated service tracking instructions 116, and/or graphical user interface instructions 118.

Service integration instructions 114 comprise computer readable instructions which, when executed by platform provider server 110, cause platform provider server 110 to initiate actions within services 112 based on actions performed through external applications hosted by an external server computer, send instructions to an external application hosted by an external server computer in response to one or more action performed through services 112, or otherwise integrate services 112 with external applications hosted by an external server computer. Service integration instructions 114 may further cause display of information on a client device in response to detecting a trigger in a workflow and/or cause performance of a workflow in response to receiving input from a client device.

Integrated service tracking instructions 116 comprise computer readable instructions which, when executed by platform provider server 110, cause platform provider server 110 to track performance of actions performed in services 112 and actions performed in external applications hosted by an external server computer. Integrated service tracking instructions 116, when executed, may further cause platform provider server 110 to generate statistics, metrics, timelines, or other data analysis from tracked actions performed in services 112 and/or tracked actions performed in external services.

Graphical user interface instructions 118 comprise computer readable instructions which, when executed by platform provider server 110, cause platform provider server 110 to generate a graphical user interface and cause display of the graphical user interface on client computing device 130. The graphical user interface may depict information related to received items of mail, images of received items of mail, priority information, category information, or other analytics. The graphical user interface may further include options for specifying actions to perform for individual items of mail, for categories of mail, for priority classifications of mail, or for groupings of mail based on other characteristics. The graphical user interface may further include options for generating categories or priority classifications for items of mail to improve existing machine learning systems.

In an embodiment, the client device 120 may be any type of client device 120 or a combination of client devices, including but not limited to a display screen, a workstation, a personal computer, a laptop computer, a tablet computing device, a personal digital assistant, or a smartphone. Client device 120 may equipped with or be associated with a scanner, camera, or any other device configured to capture a digital image. The client device 120 may also be a specialty device configured to open, prepare, and scan envelopes and/or the inner contents of envelopes. Although embodiments are depicted in the figures and described herein in the context of a single client device 120, embodiments are not limited to this example and any number of client devices may be used.

The one or more managed devices 120 comprises a device configured capture digital images of mail. The one or more managed devices 120 may be located within a mail facility and be configured to capture an image of an address-bearing face of the mail. The one or more managed devices 120 may additionally be configured to capture images of contents of mail items. For example, the one or more managed devices 120 may be configured to open items of mail and scan the contents of the items of mail. In an embodiment, the one or more managed devices 120 is configured to determine whether to open an item of mail to scan the contents based on an analysis of an image of the address-bearing face of the item of mail. For example, the one or more managed devices 120 may use an OCR scan of the address-bearing face of the item of mail to identify a recipient and may determine, based on stored data, whether to open the item of mail and scan the contents based on the identified recipient.

The client computing device 130 may be any type of client computing device 130 or a combination of client devices, including but not limited to one or more server computers, personal computers, laptops, smart phones, or the like. Although embodiments are depicted in the figures and described herein in the context of a single client computing device 130, embodiments are not limited to this example and any number of client computing devices may be used. For example, client computing device 130 may be multiple computers acting in conjunction with a web server to display a graphical user interface depicting information relating to items of mail.

B. Database

In an embodiment, inbound communication data may be retrieved from customer database 140. As used herein, the term "database" refers to a corpus of data, organized or unorganized, in any format, with or without a particular interface for accessing the corpus of data. Customer database 140 may comprise information regarding customers associated with a mail facility. The customer database 140 may include information such as customer name, addresses, phone numbers, digital addresses, usernames, role data for different users, stored preference data for customers, previous mail information, including images and metadata, such as time of arrival, weight, size, or color, and/or other customer or mail related data.

C. Network

Network 150 broadly represents a combination of one or more local area networks (LANs), wide area networks (WANs), metropolitan area networks (MANs), global interconnected internetworks, such as the public internet, or a combination thereof. Each such network may use or execute stored programs that implement internetworking protocols according to standards such as the Open Systems Interconnect (OSI) multi-layer networking model, including but not limited to Transmission Control Protocol (TCP) or User Datagram Protocol (UDP), Internet Protocol (IP), Hypertext Transfer Protocol (HTTP), and so forth. All computers described herein may be configured to connect to the network 150 and the disclosure presumes that all elements of FIG. 1A are communicatively coupled via network 150. The various elements depicted in FIG. 1A may also communicate with each other via direct communications links that are not depicted in FIG. 1A for purposes of explanation.

D. Services Platform

Figure 1B:
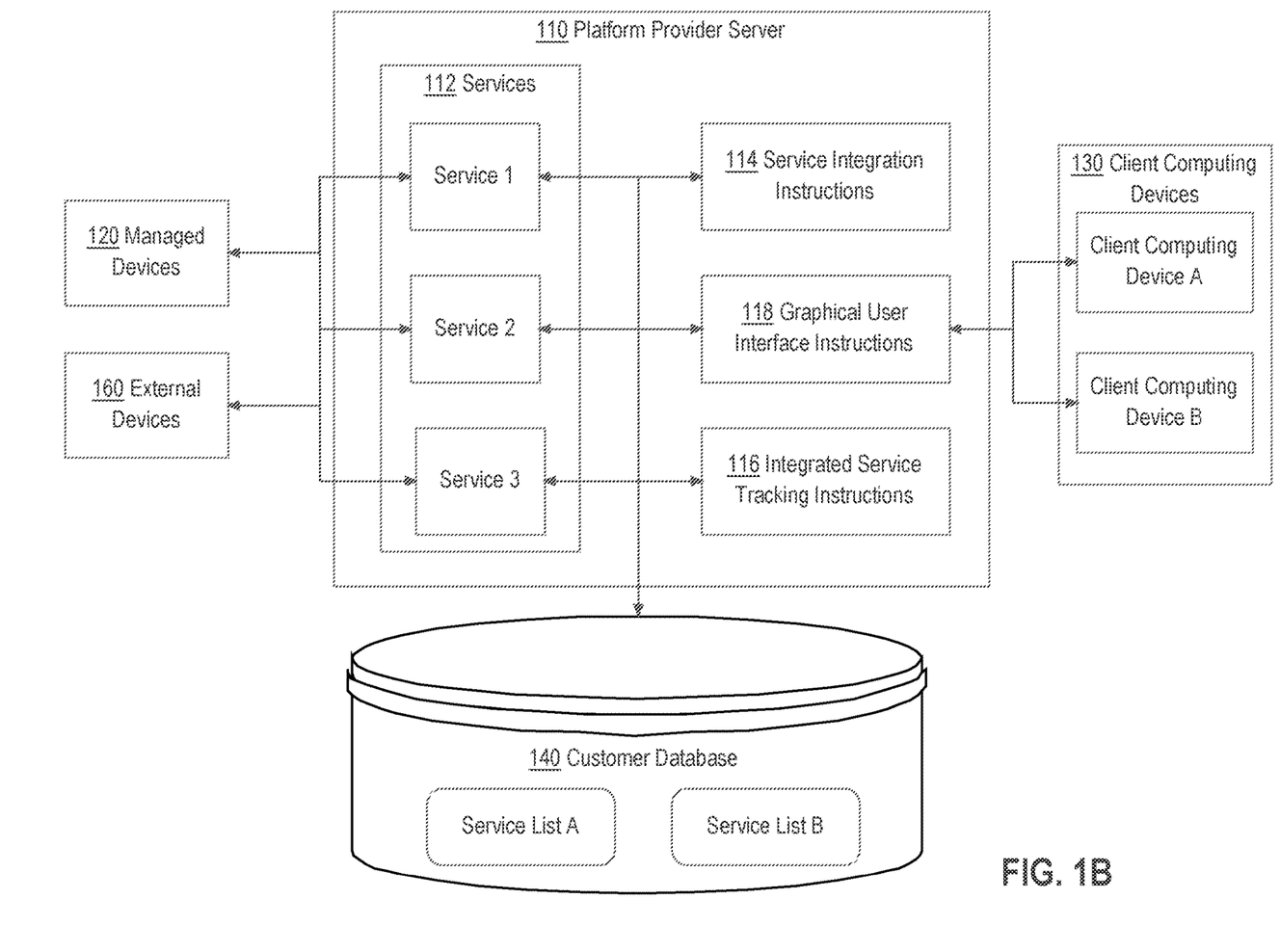
FIG. 1B depicts service integration through a platform provider server.

FIG. 1B depicts service integration through a platform provider server. Managed devices 120 and/or external devices 160 communicate with one or more of services 112. The external devices 160 may comprise computing devices that send communications to the platform provider server 110 as part of one or more of services 112.

Services 112, as depicted in FIG. 1B, include three different services any or all of which may be activated for each of the client computing devices 130. The different services 112 may be configured to operate individually such that the platform provider server 110 is able to provide each service individually to a client computing device. Client computing devices 130 may correspond to different users and/or accounts. The client computing devices 130 may have different services activated for use. For example, services 1 and 3 may be activated for client computing device A while services 2 and 3 are activated for client computing device B.

Customer database 140 may store service lists which indicate which services are activated for each client computing device, user, and/or account. For example, service list A may store data indicating that services 1 and 3 are activated for client computing device A while service list B may store data indicating that services 2 and 3 are activated for client computing device B. Other information stored by customer database 140 may also be segmented by device, user, and/or account, such as configuration settings or data stored in relation to a service. The activated services may be specified by the client computing devices. For example, client computing device A may request activation of services 1 and 3 over a network to platform provider server 110.

Integrated service tracking instructions 116 may exist separate from services 112 and may be configured to track interactions in services 112, receive information pushed from services 112, and/or send requests to services 112 to cause performance of one or more actions. Thus, integrated services tracking instructions 116 may identify triggers for performing workflows based on data received from services 112 or external services, determine one or more actions to be performed, and send a request to services 112 or external services to request performance of the actions.

Graphical user interface instructions 118 may be configured to combine different services into a single graphical user interface for display to client computing device A and client computing device B. The graphical user interfaces may include different combinations of services based on services requested by the different client computing devices. Thus, a graphical user interface displayed to client computing device A may include services 1 and 3 while the graphical user interface displayed to client computing device B may include services 2 and 3.

The systems and methods described herein allow different client computing devices to activate a subset of available services based on individual needs. The subset of services can then be displayed in a single interface with triggers activating workflows between services that have been activated. This creates a customizable interface with only requested services that are capable of interacting through the integrated services tracking instructions 116, thereby executing as one customized service. The systems and methods described herein, by customizing activated services and triggers, reduce the amount of data sent over the network between devices and improve display of graphical user interfaces by displaying only the activated services.

III. Services

Figure 2:
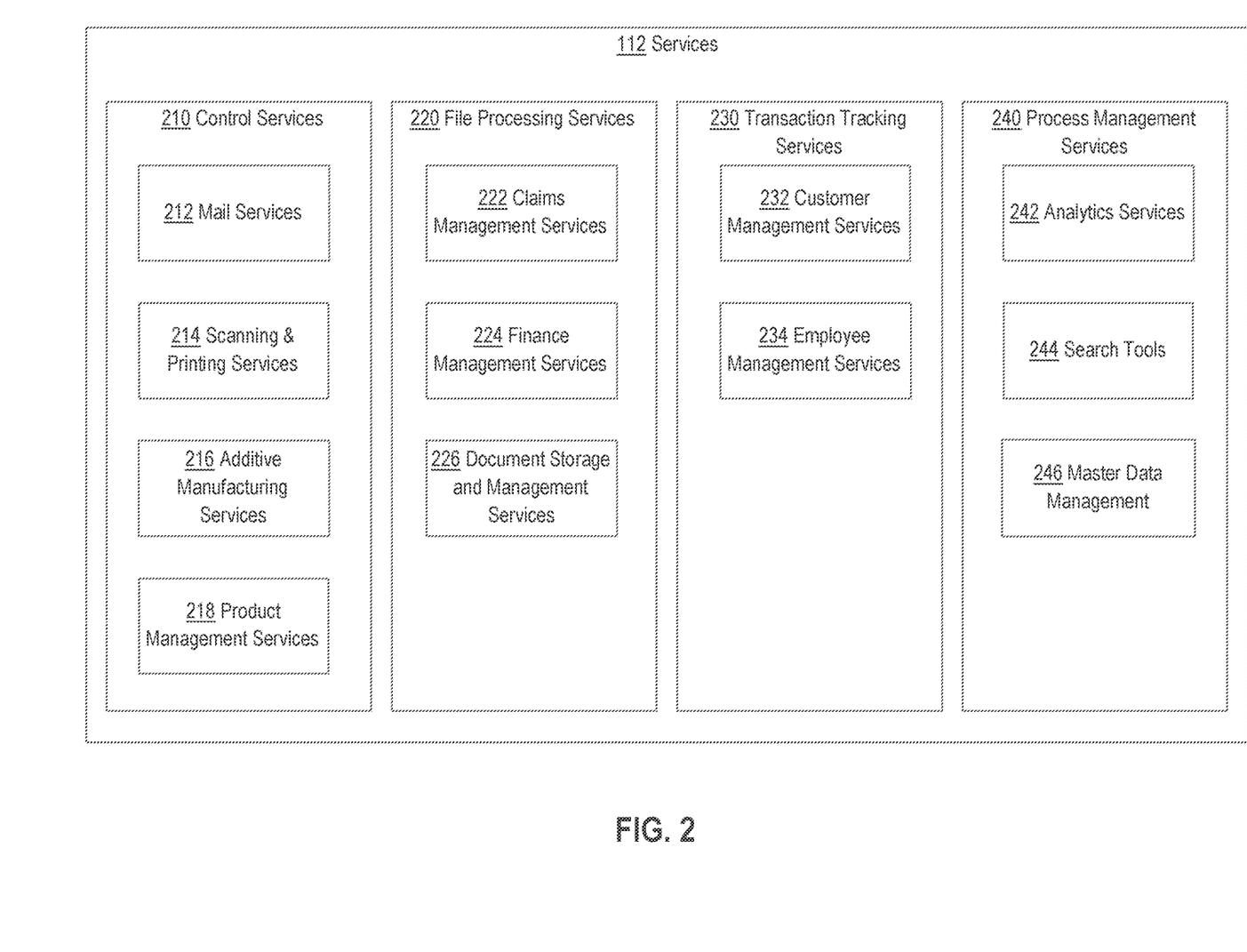
FIG. 2 depicts an example of different types of services provided by a server computer.

Services 112 comprise one or more sets of applications and interfaces related to an aspect of a business. Services 112 may include data storage, task management, notifications, interfaces, document generation, analytics, metric generation, and/or other application aspects related to the individual services. FIG. 2 depicts an example of different types of services provided by a server computer. FIG. 2 includes category groupings to provide a clear example and in embodiments services are provided individually. In some embodiments, a subset of the services 112 are activated for an enterprise profile.

A. Control Services

Control services 210 comprise software services configured to control physical machinery at one or more locations. Examples of control services include mail services 212, scanning & printing services 214, additive manufacturing services 216, and product management services 218.

i. Service Types

Mail services 212 comprise one or more software services related to physical mail processes, including receiving of mail, scanning of mail items, opening of mail items and scanning of contents, automated actions with respect to mail items, scanning of received items through optical character recognition (OCR), categorization of scanned mail items, identification of information from scanned mail items, and correlation of scanned mail items with other received data, such as data streams related to the mail items.

The mail services 212 may include a control and information generation aspect and a user interface aspect. The control and information generation aspect may include receiving mail items, scanning mail items, opening mail items, sending mail items, printing labels, extracting information, categorizing mail items from extracted information, determining priority of mail items, and/or other data extraction or correlation techniques. The user interface aspect may include providing images of mail items, providing options for selecting actions to perform with mail items, providing category or priority information, generating alerts based on category or priority information, providing options for selecting automated actions based on category or priority information, or any other improved displays or analytics relating to mail items.

Scanning and printing services 214 may comprise services relating to control and management of data of scanning devices, printing devices, and/or multi-function peripherals. Scanning and printing services 214 may include causing documents to be printed, causing documents to be scanned, extraction of information from scanned documents, collation of printed documents, generation of analytics related to scanning or printing of documents, load balancing of scanning or printing across a plurality of devices, monitoring of scanning or printing machinery, generation of alerts related to scanning or printing devices, or other services related to scanning or printing of documents.

Additive manufacturing services 216 comprise services relating to additive manufacturing devices, such as 3D printers. Additive manufacturing services 216 may include control of additive manufacturing devices, load balancing of additive manufacturing devices, monitoring of additive manufacturing devices, generation of analytics related to additive manufacturing devices, or other services related to additive manufacturing devices.

Product management services 218 comprise services related to building and providing of one or more products. Product management services 218 may include inventory tracking, control of machinery used to create products, monitoring of machinery used to create products, supply chain monitoring, analytics generation, generation of purchase orders, or other services relating to product management.

ii. Workflow Integration

In an embodiment, the platform provider server 110 stores data defining one or more triggers for one or more of the control services 210. The triggers, as used herein, refer to determinations by the platform provider server 110 that an action is to be performed in response to an event. Thus, the trigger may define an event that occurs within a particular workflow and a responsive action to be performed. In an embodiment, the triggers comprise initiation of actions within workflows of other services 112 provided by the platform provider server 110 and/or external services provided by external server computers in response to events that occur within control services 210. Additionally or alternatively, the platform provider server 110 may store triggers that comprise initiation of actions within control services 210 in response to monitored events in external services.

In an embodiment, a trigger comprises an action taken in response to mail services 212 making a determination related to an incoming item of mail. For example, the platform provider server 110 may cause one or more devices to scan an envelope of an item of mail or contents of an item of mail. The platform provider server 110 may then use OCR to identify words or phrases in the scanned image and, based on the words or phrases, the platform provider server 110 may identify a category of the item of mail. The category determination may be based on specific words and/or their position. For example, if insurance claim reports include the words "Insurance Claim" in the top middle of a document, the system may determine an item of mail is an insurance claim report if the words "Insurance Claim" are identified in the top middle of the document. More complex methods for categorizing items of mail may include evaluating a plurality of rules and/or machine learning techniques trained using images and/or recognized text in documents. Other implementations of determining categories include deep learning, data science, natural language processing transcription of handwritten information, natural language processing document separation, dynamic multi-line field recognition to capture context, automatic text recognition in particular fields of semi-structured or unstructured documents, or text pattern identification across one or more documents.

The action taken in response to mail services 212 categorizing the incoming item of mail may include causing generating workflows for the scanned image of the mail item through one of services 112 or one or more external applications. The service and/or external application used may be determined based on the category of document. For example, if the document is determined to be an insurance claim, the system may identify a claims management application and generate a workflow for the claims management application using the scanned document. The workflow may include extracting specific information from the document, generating tasks with respect to the document, storing the document in a particular location based on extracted information, sending notifications to a client computing device to take actions based on a document classification, or other workflows.

In an embodiment, incoming mail items are linked to other services 112 or external applications based on tracking information. For example, the platform provider server may identify a category for a received item of mail and/or identify a unique identifier in the item of mail. The platform provider server 110 may identify a previous workflow to which the received item relates, such as through cross references of the unique identifier with a unique identifier in other workflows and/or through searching through previous workflows corresponding to the identified category. The system may update the previous workflows based on the received mail item. For example, if the system identifies a response to a previously filed insurance claim based on a claim number, the system may update data associated with the previously filed insurance claim to indicate the response, set up a payment, and/or generate a task based on the response. Additionally, the system may track a turnaround time for the response based on a date of filing the claim in the initial workflow and a date of receipt of the response.

In an embodiment, workflows are generated for scanning and printing services 214 or additive manufacturing services 216 in response to a trigger through a different workflow. For example, the system may cause printing of reports and/or records in response to a trigger in a different workflow, such as receipt of a patient's scans through a patient portal. As another example, the system may cause manufacturing of an item through additive manufacturing services 216 in response to identifying a workorder in mail services 212 and/or receiving a request through a purchase application.

In an embodiment, a purchase order is generated through product management services 218 and/or an external application in response to triggers in mail services 212, scanning and printing services 214, or additive manufacturing services 216. As an example, the platform provider server may track inventory of materials used by mail services 212, scanning and printing services 214, or additive manufacturing services 216. In response to receiving a task to perform, the platform provider server 110 may determine whether performance of the task would cause an amount of materials in the inventory to be reduced past a threshold amount. If so, the platform provider server may generate a procurement order for the materials. Examples include stamps, envelopes, printer paper, printer ink, and additive manufacturing plastics or metals.

B. File Processing Services

File processing services 220 comprise software services configured to process incoming, outgoing, and/or stored files. File processing services 220 may comprise different services for different types of file management, such as insurance claims, medical records, workers compensation claims, accounts payable, check processing, warranty management, or other services specific to industries and/or industry needs. Examples of file processing services 220 include claims management services 222, finance management services 224, and document management services 226.

i. Service Types

Claims management services 222 may comprise services relating to management of external and/or claims. Example claims include insurance claims, medical claims, worker's compensation claims, disability claims, or other claims processing services. Claims management services 222 may include instructions for collating claims data, extracting data from claims documents, scheduling task deadlines for claims, storing claims data, generating analytics for claims, and generating and displaying interfaces related to claims.

Finance management services 224 may comprise services relating to financial records, such as check processing, accounts payable services, budget allocations, or other services relating to the tracking and management of funds. Finance management services 224 may include instructions for extracting data from financial documents, setting rules for notifications based on account balances or costs, allocating funds to individual bills, security of financial information, or other finance management services.

Document storage and management services 226 may comprise services relating to the storage and management of electronic digital documents, such as database management services, docketing services, automated document generation, document editing programs, document collaboration programs, or other software services relating to the generation, editing, management, and storage of electronic digital documents.

ii. Workflow Integration

In an embodiment, document storage and management services 226 are configured to generate and/or store documents based on triggers within other services. For example, a trigger in mail services 212 may cause the system to generate a document related to a mail item, store the document and/or a scan of the mail item in a particular location, update a database record, or docket a due date based on the received mail item. Other examples may include updating a database record in response to actions being performed through other services and/or generating or storing documents based on requests from other services.

In an embodiment, multiple workflows in different applications or services may be triggered by a single event. For example, when a patient is discharged at a hospital, claims management services 222 may generate billing documents and/or insurance claims while other services may track patient outcome management, including scheduling follow-up appointments, sending messages or patient health information to a patient account, or tracking metrics across different services. The workflows may additionally feed into other services. For example, a bill generated through claims management services 222 may trigger a generation of a mailing label through mail services 212 which then cause the bill to be mailed out. If the bill is returned through return mail services, a trigger may be sent back to claims management services to indicate that an address on file is incorrect. Conversely, if a payment is received through a mail, such as through a provided envelope, the mail services 212 may determine, based on an image of the envelope and/or contents, that the payment relates to a claim of claims management services 224 and send the payment, including images of any documents, to claims management services 224.

In an embodiment, finance management services 224 are integrated into product management services 218 thereby generating workflows for an "order to cash" process. The workflows may include a remittances process, integrated receivables, billing and presentment, and collections. By integrating the processes of order processing with finance management services 224, the system is able to generate improved displays which provide a comprehensive view around an entire process of "order to cash".

In an embodiment, the finance management services 224 generate reports from previously received records, such as treasury & risk records, tax solutions, reporting and analytics, fixed asset management and/or electronic check processing. Services such as purchase to pay (PtP), order to cash (OtC), and record to report (RtR) may additionally use data sent from different services, such as mail services 212 and/or product management services 218.

In an embodiment, claims management services 222 may include triggers to cause execution of different workflows relating to document processing and management. For example, insurance claims automation for workers compensation, medical insurance, property insurance, casualty insurance, and/or life insurance may include triggers such as a trigger that causes generation of first notice of loss (FNOL) documents, third party insurance integration, such as automatically sending and processing claims with third parties, policy issuance integrated into mail services, underwriting services, and/or policy administration services. In an embodiment, information is gathered from interactions with other services to generate training datasets for machine learning systems that are used to determine a risk in providing insurance. The other services may include interactions with financial services, medical services, or customer facing graphical user interfaces.

Example triggers in claims management services 222 may include interactions with claims management services 222 from a client computing device or external computing device. For example, data may be received from an external computing device initiating an insurance claim. The data may include a user identifier, information relating to the claim, and/or images relating to the claim, such as an image of a car accident. The initiation of the claim from the external computing device can be a trigger for different workflows, including customer management services, document processing and management services, employee management services, or other services that use data relating to the initiated claim.

C. Transaction Tracking Services

Transaction tracking services 230 comprise software services configured to track customer and/or client interactions with different services and/or with a generated and displayed graphical user interface. Examples of transaction tracking services 230 include customer management services 232 and employee management services 234. Transaction tracking services 230 may be configured to generate metrics and/or improved displays for a graphical user interface which depict information gathered from different services 212.

i. Service Types

Customer management services 232 comprise services relating to customer interaction. Examples of customer management services 232 may include support services, user interface generation and/or display, customer record storage, account authentication or other security services, and interface interaction tracking.

Employee management services 234 comprise services relating to employee management. Examples of employee management services 234 may include employee onboarding and/or training services, human resource services, workforce management services, billing applications, and document storage for employee data.

ii. Workflow Integration

In an embodiment, customer management services 232 generate customer journey information using data supplied through triggers in other services 112. For example, initial interactions through a customer service portal, product development information and materials from product management services 218, billing records from finance management services 224, and/or mail send and receive dates from mail services 212 may be identified through various workflows, aggregated, and displayed on a graphical user interface.

As a practical example, initial product development through product management services 218 may include a product reference number. The system may store the product reference number, a date of initial product development, and any other information related to the product. When a work order is generated for manufacturing of a prototype or for purchasing materials, the system may identify the product number and send data relating to the purchase to customer management services 232. When an item of mail is received that includes the product reference number, mail services 212 may send data to customer management services 232 identifying the product and the item of mail. When a bill is paid that include the product reference number, finance management services 224 may send the bill information to customer management services 232. Using the information from the various workflow triggers, customer management services 232 may compute aggregated values, such as an amount of time in development, a total cost of the product, a turnaround time for purchase orders and bills, and other information relating to the development and sale of the product. The customer management services 232 may additionally identify inefficiencies, such as parts of the process that take longer time than average and hold up other parts of the process, and display information identifying these inefficiencies. The customer management services 232 may further identify each type of cost associated with the product and display the types of cost on the graphical user interface, thereby providing complete information relating to a product despite much of the information having been processed through disparate services.

Employee management services 234 may similarly receive information relating to interactions with various services by a particular employee. For example, when an employee signs into one of the services, the services may send data to employee management services 234 comprising an identifier of the employee and an identifier or the service being accessed. Similar workflows may exist for when a task is started or completed through a different service, when documents are generated or stored through a different service, when mail is sent or received by the employee through mail services 212, and/or when controls physical equipment through control services 210. An employee tracking interface may identify the tasks performed by the employee through different services, the documents creates and/or edited by the employee through different services, turn-around times for tasks performed through different services, and any other tracked information relating to employee engagement through different services.

In an embodiment, employee management services 234 further include generation and display of procurement to pay statistics for employees. The procurement to pay statistics may include travel and expense management, liquidity solutions, a buyer/supplier network, accounts payable automation, and/or request-to-pay solutions.

In an embodiment, the customer management services 232 generates and trains a machine learning system using information obtained from other workflows. For example, the system may train the machine learning system to compute a likelihood of keeping or losing a customer over a particular period of time. Example inputs into the machine learning system may include customer expenditures, turn-around times on payment or billing, a number and/or type of customer interactions with the system, such as complaints made through customer support and/or usage of features supplied by a service provide, and/or changes in purchasing habits over time. These training inputs may be gathered from different services and stored by customer management services 232. As an example, when a customer order is received, a date and/or time of the customer order may be sent to customer management services 232, a bill may be generated through finance management services 224, and sent through mail services 212. Times or dates of bill generation and mailing may be sent from the services to customer management services 232. Additionally, when a check is received through mail services 212, the date or time of receipt may be sent to customer management services 232 and a workflow may be generated through finance management services 224 to process the check. Through this data, customer management services 232 may determine a turn-around time from customer order to customer payment which may be used as an input in the machine learning model.

Similarly, the employee management services 234 may generate and train machine learning systems to compute likelihoods of hiring of employees and/or likelihood of an employee being successful. For example, the employee management services 234 may receive statistics relating to different employee interactions with the system and generate metrics indicating a value of the employee, such as metrics relating to sales figures, customer retention, or other metrics. A training dataset may be generated using initial hiring information of the employee, such as the employee resume, as inputs and employee success metrics as outputs. The training datasets may be used to generate a machine learning system configured to determine success of employees by predicting success metrics from hiring inputs, such as resume information.

D. Process Management Services

Process management services 240 comprise software services configured to generate analytics and control data relating to a combination of services. Examples of process management services 240 include analytics services 242, search tools 244, and master data management 246.

i. Service Types

Analytics services 242 comprise services relating to the generation and display of analytics gathered from one or more software services. Analytics services 242 may include services that gather information from other services, services that generate analytics related to other services, and/or services that generate improved displays that depict analytics generated from data gathered from different services. The analytics services 242 may request data from different services and/or receive data in response to different triggers. Analytics services 242 may generate information relating to the usage of different systems and may display the generated data through graphs, charts, or other visual tools. The interfaces are improved through the combination of analytics which are generated by different services and would otherwise not be visible in a single location.

Analytics generated by analytics services 242 may comprise predictive and/or prescriptive analytics. Prescriptive analytics may identify parts of a workflow with a largest process burden or slowest turn around time, thereby identifying processes that can be optimized. Prescriptive analytics may additionally include comparisons to other businesses. For example, a turn around time on processing invoices may be compared to an average of a plurality of competitors, thereby identifying processes which have been optimized by competitors. Predictive analytics may be used to predict times of year when additional work is received or when workflows would be slower. These predictive analytics may use historical data to predict when processes may take longer, require more manpower, or otherwise change in operation.

Search tools 244 comprise services relating to performing searches of data stored by the system and/or data relating to one or more other services. Search tools 244 may include a federated search with options for searching through data stored in connection with different services. In an embodiment, search tools 244 provide one or more graphical user interfaces for searching for through data stored by different services. The system may cause the search to be performed against a master data repository and/or may send individual search requests to the different services for data matching a search request. Results of the search may be displayed in a single graphical user interface with data identifying a service in connection with the results. In response to selection of a result, the system may cause a request to be sent to a service related to the result to cause displaying of the resulting document or feature.

Master data management 246 comprises services relating to management of data stored by one or more services. Master data management 246 may cause data used by different services to be stored in a master data repository. Master data management 246 may cause de-duplication of data stored by different services and provide pointers to a location in a master data repository where de-duplicated information is stored.

E. External Services

External services comprise services provided by a separate server computer. External services may provide similar services as any of services 212 and/or different services. Integration with external services allows the platform provider server 110 to provide dynamic functionality to a client computing device 130. Thus, data utilization and interservice functionality is not harmed by a client computing device 130 utilizing services not provided by the platform provider server 110.

IV. Procedural Overview

Figure 3:
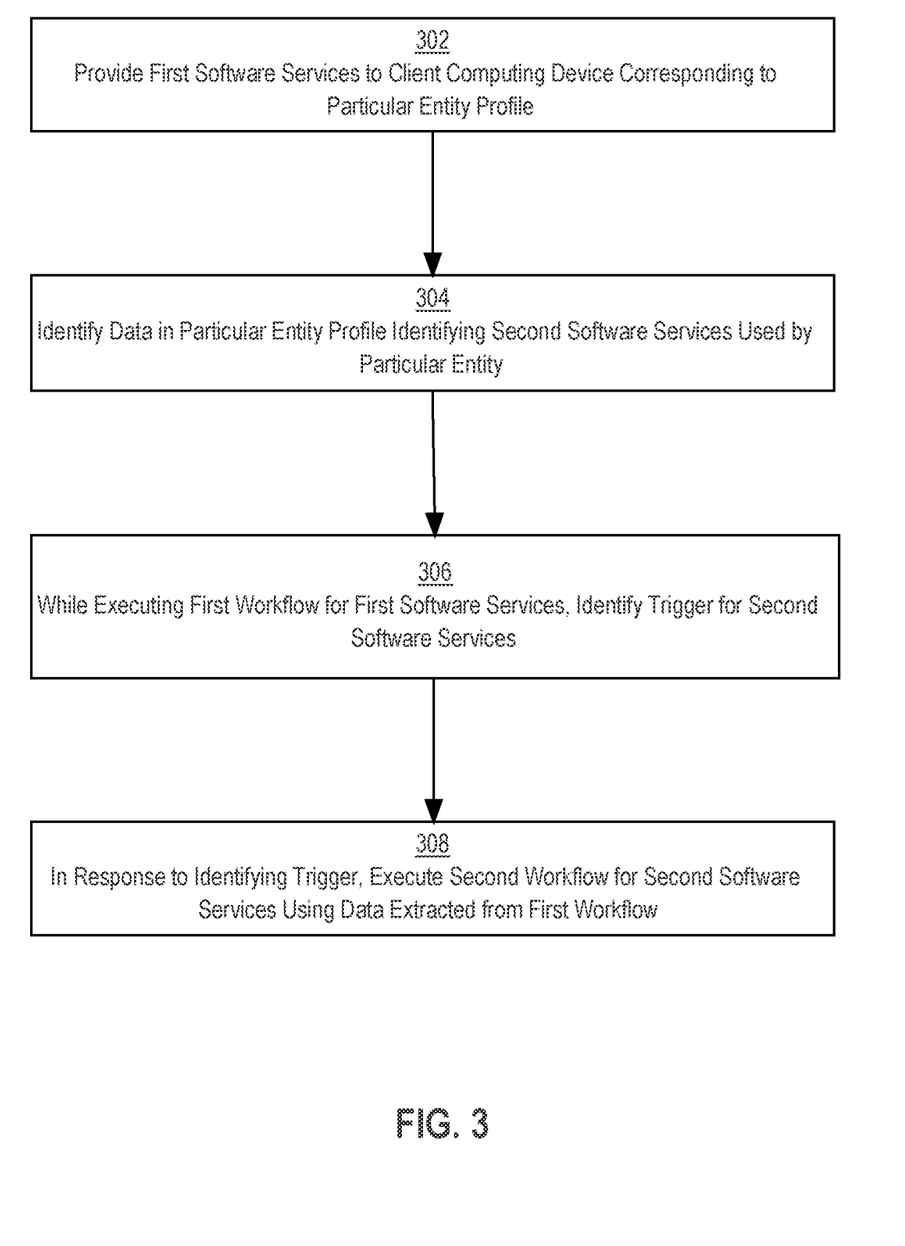
FIG. 3 depicts an example method for integrating a plurality of services.

FIG. 3 depicts an example method for integrating a plurality of services. FIG. 3 may serve as an algorithm or instructions for programming the functional elements of the networked computing system 100 to perform the operations described below.

At step 302, first software services are provided to a client computing device corresponding to a particular entity profile. An entity may comprise a person, partnership, business, or group of individuals. An entity profile comprises a unique account for the entity. The entity profile may include an identification of services provided to the entity by the platform provider server 110. Different entity profiles may identify different provided services based on selections from client computing devices corresponding to the entities. Thus, services provided to the entities may be modular in nature, with utilization of services being dependent on an entity's need.

The first software services may comprise services provided by the platform provider server 110 and/or services provided by an external server computer. For external services, the platform provider server 110 may store data identifying the external services and authentication data for the external services that correspond to the entity, such as a username, password, or alternative authentication method. For example, the system may be provided with separate authentication from the client computing device to access information from the external service, such as through a single sign on (SSO) implementation which utilizes certificates to authenticate the platform provider server 110.

At step 304, the system identifies data in the particular entity profile identifying second software services used by the particular entity. The second software services may comprise software services provided by the platform provider server 110 that have been activated for the particular entity account. In other embodiments, the second software services comprise external services through which the platform provider server 110 may request performance of additional actions.

At step 306, while executing a first workflow for the first software services, the system identifies a trigger for the second software services. For instances where the first software services are provided by the platform provider server 110, the platform provider server 110 may store the triggers as part of the workflow for the first software services when the first software services or second software services are activated. For example, a trigger may be stored in the mail services 212 workflow in which the mail services 212 compare a unique identifier in an item of mail to unique identifiers from other services and, in response to identifying the unique identifier, sends an image of the item of mail to a corresponding service. For instances where the first software services are provided by an external server computer, the triggers may be expressly built into the first software services and/or integrated into services provided by the platform provider server 110 through an enterprise service bus (ESB). When integrated into the ESB, the platform provider server 110 may store the triggers and obtain data through the ESB when actions are performed to determine whether the triggers have been activated. When the triggers are activated, the system may request additional data from the ESB, such as data required to perform additional workflows.

While embodiments are described with respect to a first and second workflow, any number of workflows may be utilized based on different triggers. Thus, one action may comprise a trigger for several workflows in different services. Embodiments may additionally include triggers that cause notifications to be sent to external devices and/or displayed through graphical user interfaces. Embodiments may additionally include external triggers, such as triggers based on requests from client computing devices, which cause execution of one or more workflows through services 212.

At step 308, in response to identifying the trigger, the system executes a second workflow for second software services using data extracted from the first workflow. For example, the platform provider server 110 may initiate a workflow through the second software services. The workflow may utilize data obtained from the first software services, such as date and time of an event, images or documents received through the first software services, or other received input data. In embodiments where the second software services are external services, the platform provider server 110 may store instructions which, when executed, cause the platform provider server 110 to initiate a workflow through an application programing interface (API) of the external service or through an ESB. The platform provider server 110 may extract data necessary for performance of the second workflow through the external service and provide the data in a manner consistent with the external service's requirements.

VI. Implementation Mechanisms

Although the flow diagrams of the present application depict a particular set of steps in a particular order, other implementations may use fewer or more steps, in the same or different order, than those depicted in the figures.

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 4:
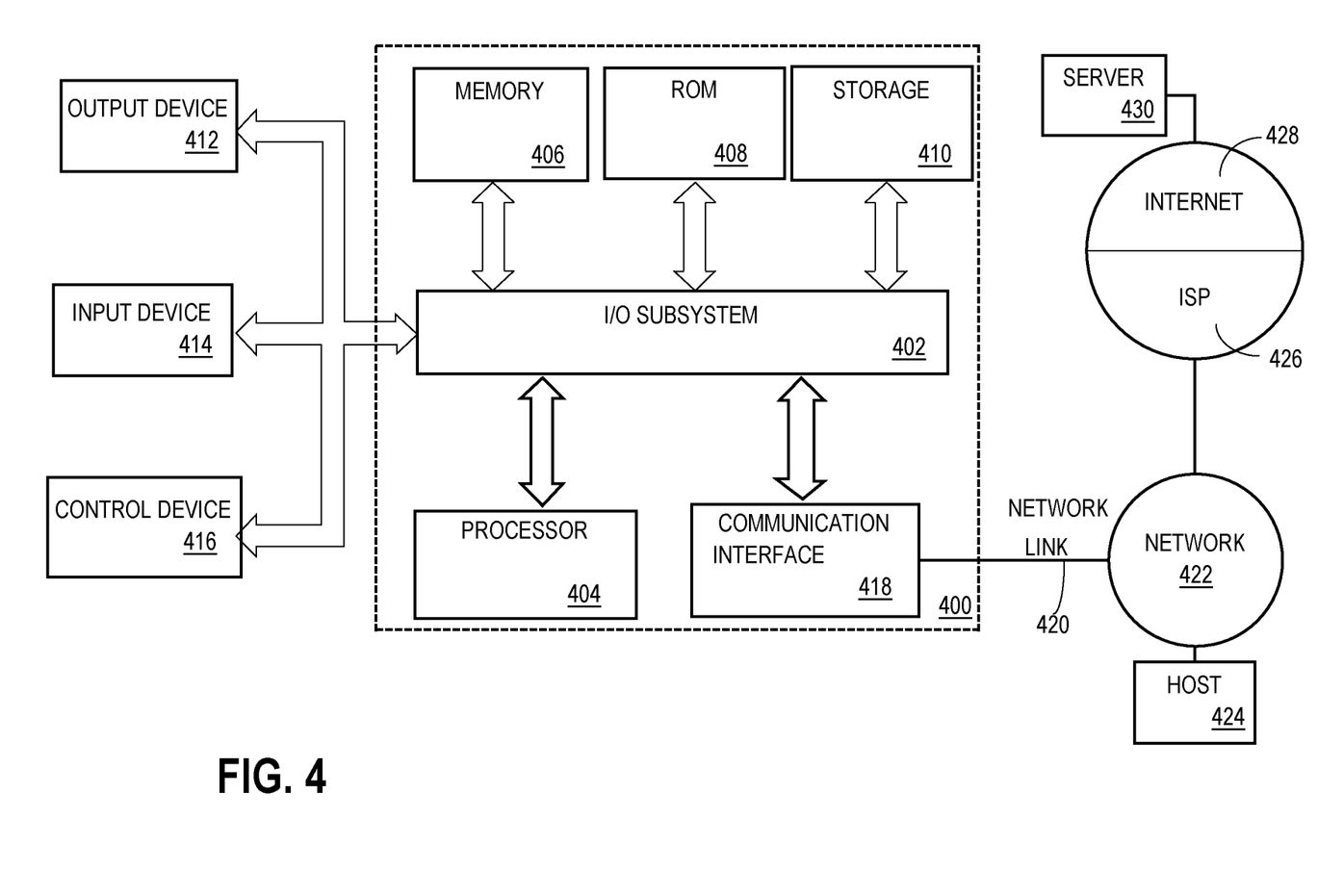
FIG. 4 is a block diagram that depicts an example computer system upon which embodiments may be implemented.

FIG. 4 is a block diagram that illustrates an example computer system with which an embodiment may be implemented. In the example of FIG. 4, a computer system 400 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 400 includes an input/output (I/O) subsystem 402 which may include a bus and/or other communication mechanism(s) for communicating information and/or instructions between the components of the computer system 400 over electronic signal paths. The I/O subsystem 402 may include an I/O controller, a memory controller and at least one I/O port. The electronic signal paths are represented schematically in the drawings, for example as lines, unidirectional arrows, or bidirectional arrows.

At least one hardware processor 404 is coupled to I/O subsystem 402 for processing information and instructions. Hardware processor 404 may include, for example, a general-purpose microprocessor or microcontroller and/or a special-purpose microprocessor such as an embedded system or a graphics processing unit (GPU) or a digital signal processor or ARM processor. Processor 404 may comprise an integrated arithmetic logic unit (ALU) or may be coupled to a separate ALU.

Computer system 400 includes one or more units of memory 406, such as a main memory, which is coupled to I/O subsystem 402 for electronically digitally storing data and instructions to be executed by processor 404. Memory 406 may include volatile memory such as various forms of random-access memory (RAM) or other dynamic storage device. Memory 406 also may be used for storing temporary variables or other intermediate information during execution of instructions to be executed by processor 404. Such instructions, when stored in non-transitory computer-readable storage media accessible to processor 404, can render computer system 400 into a special-purpose machine that is customized to perform the operations specified in the instructions.

Computer system 400 further includes non-volatile memory such as read only memory (ROM) 408 or other static storage device coupled to I/O subsystem 402 for storing information and instructions for processor 404. The ROM 408 may include various forms of programmable ROM (PROM) such as erasable PROM (EPROM) or electrically erasable PROM (EEPROM). A unit of persistent storage 410 may include various forms of non-volatile RAM (NVRAM), such as FLASH memory, or solid-state storage, magnetic disk or optical disk such as CD-ROM or DVD-ROM, and may be coupled to I/O subsystem 402 for storing information and instructions. Storage 410 is an example of a non-transitory computer-readable medium that may be used to store instructions and data which when executed by the processor 404 cause performing computer-implemented methods to execute the techniques herein.

The instructions in memory 406, ROM 408 or storage 410 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 400 may be coupled via I/O subsystem 402 to at least one output device 412. In one embodiment, output device 412 is a digital computer display. Examples of a display that may be used in various embodiments include a touch screen display or a light-emitting diode (LED) display or a liquid crystal display (LCD) or an e-paper display. Computer system 400 may include other type(s) of output devices 412, alternatively or in addition to a display device. Examples of other output devices 412 include printers, ticket printers, plotters, projectors, sound cards or video cards, speakers, buzzers or piezoelectric devices or other audible devices, lamps or LED or LCD indicators, haptic devices, actuators or servos.

At least one input device 414 is coupled to I/O subsystem 402 for communicating signals, data, command selections or gestures to processor 404. Examples of input devices 414 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 416, which may perform cursor control or other automated control functions such as navigation in a graphical interface on a display screen, alternatively or in addition to input functions. Control device 416 may be a touchpad, a mouse, a trackball, or cursor direction keys for communicating direction information and command selections to processor 404 and for controlling cursor movement on display 412. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 414 may include a combination of multiple different input devices, such as a video camera and a depth sensor.

In another embodiment, computer system 400 may comprise an internet of things (IoT) device in which one or more of the output device 412, input device 414, and control device 416 are omitted. Or, in such an embodiment, the input device 414 may comprise one or more cameras, motion detectors, thermometers, microphones, seismic detectors, other sensors or detectors, measurement devices or encoders and the output device 412 may comprise a special-purpose display such as a single-line LED or LCD display, one or more indicators, a display panel, a meter, a valve, a solenoid, an actuator or a servo.

When computer system 400 is a mobile computing device, input device 414 may comprise a global positioning system (GPS) receiver coupled to a GPS module that is capable of triangulating to a plurality of GPS satellites, determining and generating geo-location or position data such as latitude-longitude values for a geophysical location of the computer system 400. Output device 412 may include hardware, software, firmware and interfaces for generating position reporting packets, notifications, pulse or heartbeat signals, or other recurring data transmissions that specify a position of the computer system 400, alone or in combination with other application-specific data, directed toward host 424 or server 470.

Computer system 400 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 400 in response to processor 404 executing at least one sequence of at least one instruction contained in main memory 406. Such instructions may be read into main memory 406 from another storage medium, such as storage 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 410. Volatile media includes dynamic memory, such as memory 406. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 402. Transmission media can also take the form of acoustic or light waves, such as those generated during radio-wave and infra-red data communications.

Various forms of media may be involved in carrying at least one sequence of at least one instruction to processor 404 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 400 can receive the data on the communication link and convert the data to a format that can be read by computer system 400. For instance, a receiver such as a radio frequency antenna or an infrared detector can receive the data carried in a wireless or optical signal and appropriate circuitry can provide the data to I/O subsystem 402 such as place the data on a bus. I/O subsystem 402 carries the data to memory 406, from which processor 404 retrieves and executes the instructions. The instructions received by memory 406 may optionally be stored on storage 410 either before or after execution by processor 404.

Computer system 400 also includes a communication interface 418 coupled to bus 402. Communication interface 418 provides a two-way data communication coupling to network link(s) 420 that are directly or indirectly connected to at least one communication networks, such as a network 422 or a public or private cloud on the Internet. For example, communication interface 418 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 422 broadly represents a local area network (LAN), wide-area network (WAN), campus network, internetwork or any combination thereof. Communication interface 418 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 418 sends and receives electrical, electromagnetic or optical signals over signal paths that carry digital data streams representing various types of information.

Network link 420 typically provides electrical, electromagnetic, or optical data communication directly or through at least one network to other data devices, using, for example, satellite, cellular, Wi-Fi, or BLUETOOTH technology. For example, network link 420 may provide a connection through a network 422 to a host computer 424.

Furthermore, network link 420 may provide a connection through network 422 or to other computing devices via internetworking devices and/or computers that are operated by an Internet Service Provider (ISP) 426. ISP 426 provides data communication services through a world-wide packet data communication network represented as internet 428. A server computer 470 may be coupled to internet 428. Server 470 broadly represents any computer, data center, virtual machine or virtual computing instance with or without a hypervisor, or computer executing a containerized program system such as DOCKER or KUBERNETES. Server 470 may represent an electronic digital service that is implemented using more than one computer or instance and that is accessed and used by transmitting web services requests, uniform resource locator (URL) strings with parameters in HTTP payloads, API calls, app services calls, or other service calls. Computer system 400 and server 470 may form elements of a distributed computing system that includes other computers, a processing cluster, server farm or other organization of computers that cooperate to perform tasks or execute applications or services. Server 470 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 470 may comprise a web application server that hosts a presentation layer, application layer and data storage layer such as a relational database system using structured query language (SQL) or no SQL, an object store, a graph database, a flat file system or other data storage.

Computer system 400 can send messages and receive data and instructions, including program code, through the network(s), network link 420 and communication interface 418. In the Internet example, a server 470 might transmit a requested code for an application program through Internet 428, ISP 426, local network 422 and communication interface 418. The received code may be executed by processor 404 as it is received, and/or stored in storage 410, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 404. While each processor 404 or core of the processor executes a single task at a time, computer system 400 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

What is claimed is:
1. A method comprising:
providing one or more first software services to a client computing device corresponding to a particular entity profile for a particular entity;
identifying, in the particular entity profile, data that identifies one or more second software services used by the particular entity;
receiving, from the client computing device, input identifying one or more fields of a particular type of electronic document processed through the one or more first software services that contains information to be used by the one or more second software services;
while executing a first workflow for the one or more first software services;
identifying a trigger for the one or more second software services based at least in part on data received from the one or more first software services, the trigger defining an event within the first workflow for the one or more first software services and a responsive action within a second workflow for the one or more second software services, and the data obtained from the one or more first software services indicat- ing an occurrence of the event within the first workflow for the one or more first software services;
identifying the particular type of electronic document; and
in response to identifying the particular type of electronic document, extracting second data from the one or more fields to be used in the second workflow; and
in response to identifying the trigger, executing the second workflow for the one or more second software services using data extracted from the first workflow,
wherein the method is executed by one or more computing devices.

2. The method of claim 1, wherein the one or more first software services comprise one or more of processing of digital media files, controlling operation of one or more physical items, tracking of transactions between the particular entity and one or more other entities, or management of systems or processes of the particular entity.

3. The method of claim 1, further comprising providing the one or more second software services to the client computing device.

4. The method of claim 1, wherein the one or more second software services are provided by the particular entity or a separate entity.

5. The method of claim 1, wherein identifying the trigger for the one or more second software services comprises determining that the data extracted from the first workflow corresponds to one or more previous instances of the one or more second software services.

6. The method of claim 1, further comprising displaying, on the client computing device, an interface depicting analytics for a process using the data extracted from the first workflow and data extract from the second workflow.

7. The method of claim 1, further comprising:
while providing the one or more first software services to the client computing device, generating one or more analytics;
determining that the one or more analytics relate to the one or more second software services;
generating and displaying, on the client computing device, a recommendation to activate the one or more second software services; and
receiving, from the client computing device, a request to activate the one or more second software services and, in response, storing the data in the particular entity profile identifying the one or more second software services as used by the particular entity.

8. A system comprising:
one or more processors;
a memory communicatively coupled to the one or more processors and storing instructions which, when executed by the one or more processors, cause performance of:
providing one or more first software services to a client computing device corresponding to a particular entity profile for a particular entity;
identifying, in the particular entity profile, data that identifies one or more second software services used by the particular entity, the one or more second software services comprising one or more external software services;
receiving, from the client computing device, input identifying one or more fields of a particular type of electronic document processed through the one or more first software services that contains information to be used by the one or more second software services;
while executing a first workflow for the one or more first software services;
identifying a trigger for the one or more second software services based at least in part on data received from the one or more first software services, the trigger defining an event within the first workflow for the one or more first software services and a responsive action within a second workflow for the one or more second software services, and the data obtained from the one or more first software services indicating an occurrence of the event within the first workflow for the one or more first software services; and
identifying the particular type of electronic document, in response, extracting second data from the one or more fields to be used in the second workflow; and
in response to identifying the trigger, executing a second workflow for the one or more second software services through an application programming interface (API) of the one or more second software services using data extracted from the first workflow.

9. The system of claim 8, wherein the one or more first software services comprise one or more of processing of digital media files, controlling operation of one or more physical items, tracking of transactions between the particular entity and one or more other entities, or management of systems or processes of the particular entity.

10. The system of claim 8, wherein the instructions, when executed by the one or more processors, further cause performance of providing the one or more second software services to the client computing device.

11. The system of claim 8, wherein the one or more second services are provided by the particular entity or a separate entity.

12. The system of claim 8, wherein identifying the trigger for the one or more second software services comprises determining that the data extracted from the first workflow corresponds to one or more previous instances of the one or more second software services.

13. The system of claim 8, wherein the instructions, when executed by the one or more processors, further cause performance of displaying, on the client computing device, an interface depicting analytics for a process using the data extracted from the first workflow and data extract from the second workflow.

14. The system of claim 8, wherein the instructions, when executed by the one or more processors, further cause performance of:
while providing the one or more first software services to the client computing device, determining, generating one or more analytics;
determining that the one or more analytics relate to the one or more second software services;
generating and displaying, on the client computing device, a recommendation to activate the one or more second software services;
receiving, from the client computing device, a request to activate the one or more second software services and, in response, storing the data in the particular entity profile identifying the one or more second software services as used by the particular entity.

15. The system of claim 8, wherein the particular type of electronic document is an electronic mail document, wherein the identifying the trigger for the one or more second software services includes: initiating actions for a file management workflow in response to identifying the electronic mail document, the actions including identifying the trigger in the electronic mail document using one or more of machine learning, image recognition, or rule evaluation.

16. One or more computer-readable storage media storing instructions which, when processed by one or more processors, cause:
    providing one or more first software services to a client computing device corresponding to a particular entity profile for a particular entity; identifying, in the particular entity profile, data that identifies one or more second software services used by the particular entity;
    receiving, from the client computing device, input identifying one or more fields of a particular type of electronic document processed through the one or more first software services that contains information to be used by the one or more second software services;
    while executing a first workflow for the one or more first software services;
    identifying a trigger for the one or more second software services based at least in part on data received from the one or more first software services, the trigger defining an event within the first workflow for the one or more first software services and a responsive action within a second workflow for the one or more second software services, and the data obtained from the one or more first software services indicating an occurrence of the event within the first workflow for the one or more first software services;
    identifying the particular type of electronic document; and
    in response to identifying the particular type of electronic document, extracting second data from the one or more fields to be used in the second workflow;
    generating one or more analytics corresponding to the one or more second software services;
    generating a recommendation to activate the one or more second software services; in response to receiving a request to execute the one or more second software services, executing a second workflow for the one or more second software services using data extracted from the first workflow; and
    initiating actions for file management workflow in response to the trigger, the actions including identifying a particular electronic document using one or more of machine learning, image recognition and rule evaluation.

17. The one or more computer-readable media of claim 16, wherein the one or more first software services comprise one or more of processing of digital media files, controlling operation of one or more physical items, tracking of transactions between the particular entity and one or more other entities, or management of systems or processes of the particular entity.

18. The one or more computer-readable media of claim 16,
    wherein the particular type of electronic document is an electronic mail document and wherein the identifying the trigger for the one or more second software services comprises:
    initiating actions for file management workflow in response to the electronic mail document, the actions including identifying the electronic mail document using one or more of machine learning, image recognition, or rule evaluation.

19. The method of claim 1, wherein the particular type of electronic document is an electronic mail document and wherein the identifying the trigger for the one or more second software services comprises:
    initiating actions for file management workflow in response to the electronic mail document, the actions including identifying the electronic mail document using one or more of machine learning, image recognition, or rule evaluation.

20. The system of claim 8, wherein the particular type of electronic document is an electronic mail document and wherein the identifying the trigger for the one or more second software services comprises:
    initiating actions for file management workflow in response to the electronic mail document, the actions including identifying the electronic mail document using one or more of machine learning, image recognition, or rule evaluation.

* * * * *